(12) United States Patent
Nanawati et al.

(10) Patent No.: US 12,536,822 B2
(45) Date of Patent: Jan. 27, 2026

(54) SYSTEMS AND METHODS FOR EXTRACTING KEY PERFORMANCE INDICATORS FROM TEXTUAL DATA

(71) Applicant: Optum, Inc., Minnetonka, MN (US)

(72) Inventors: Shreyansh S Nanawati, Kalyan (IN); Deeksha Thareja, New Delhi (IN); Mrityunjai Singh, Noida (IN); Aviral Sharma, Jaipur (IN); Jatin Lamba, Kheri (IN)

(73) Assignee: Optum, Inc., Minnetonka, MN (US)

( * ) Notice: Subject to any disclaimer, the term of this patent is extended or adjusted under 35 U.S.C. 154(b) by 440 days.

(21) Appl. No.: 18/343,816

(22) Filed: Jun. 29, 2023

(65) Prior Publication Data
US 2025/0005944 A1 Jan. 2, 2025

(51) Int. Cl.
 *G06V 30/148* (2022.01)
 *G06Q 10/0639* (2023.01)
 *G06V 30/413* (2022.01)

(52) U.S. Cl.
CPC ..... *G06V 30/148* (2022.01); *G06Q 10/06393* (2013.01); *G06V 30/413* (2022.01)

(58) Field of Classification Search
CPC .. G06V 30/147; G06V 30/148; G06V 30/413; G06V 30/416; G06Q 10/06393
See application file for complete search history.

(56) References Cited

U.S. PATENT DOCUMENTS

| | | | |
|---|---|---|---|
| 10,565,502 | B2 | 2/2020 | Scholtes |
| 10,599,767 | B1 | 3/2020 | Mattera et al. |
| 11,080,295 | B2 | 8/2021 | Chang et al. |
| 2018/0075128 | A1* | 3/2018 | Srinivasan ......... G06Q 30/0201 |
| 2022/0181029 | A1 | 6/2022 | Colley et al. |
| 2024/0311578 | A1* | 9/2024 | Laudij ................... G06F 40/103 |

OTHER PUBLICATIONS

Kamaruddin, et al. (Automatic Extraction of Performance Indicators from Financial Statements). (Year: 2009).*
Hillebrand et al., "KPI-Bert: A Joint Named Entity Recognition and Relation Extraction Model for Financial Reports," IEEE, published on Aug. 3, 2022, retrieved from https://arxiv.org/pdf/2208.02140.pdf.

* cited by examiner

*Primary Examiner* — Daniel G Mariam
(74) *Attorney, Agent, or Firm* — Bookoff McAndrews, PLLC

(57) ABSTRACT

A method includes: determining a first bounding box in textual data; categorizing the first bounding box into a paragraph category among a list of categories including a header category, a section header category, the paragraph category, and a noise category; extracting a candidate noun from the text in the categorized first bounding box, as a candidate paragraph noun; extracting a candidate value from the text in the categorized first bounding box; generating a relationship between the candidate paragraph noun and the extracted candidate value; associating the candidate paragraph noun with a candidate header noun; and generating a key performance indicator using the candidate header noun, the candidate paragraph noun, the candidate value, and the generated relationship.

20 Claims, 8 Drawing Sheets

211

C. [Payment terms,] All reimbursement requests submitted through system will be processed by Vendor on a bi-weekly bases. [Vendor will promptly pay, or cause to be so paid, clean Claims submitted by Pharmacy in accordance with applicable State law, but in any event within thirty (30) days of receipt.] Pharmacy shall accept the payments described herein as payment in full for the obligation of Vendor to reimburse Pharmacy for Covered Medications and for Covered Services. Pharmacy shall not be entitled to reimbursement by any other third party for Covered Medications and Services. Any amount so collected by Pharmacy shall be reported and paid to Vendor; or Vendor may, at its option, deduct any such amount from its future payments to Pharmacy. Pharmacy understands and agrees that any payments Vendor makes directly or indirectly to Pharmacy under this Agreement shall not be made as an inducement to reduce, limit, or delay Medically Necessary Covered Services to any Member.

212

Parent KPI: Payment Terms
Sub - KPI: Clean Claims Submission Timeline
Value: Thirty (30) days
Value Context: of receipt

221

[kpi]
PAYMENT                                                              [sub - kpi]
Unless otherwise required by applicable law, [all electronic claims] for prescription drugs must be submitted to vendor [within ninety (90) days after the prescription is filled,] unless a longer period is allowed by Plan Sponsor.
     [Value]           [Value Context]

222

231 electronic claims submission timeline: - within ninety (90) days after the prescription is filled 2.17  Pharmacy shall meet the performance standards as outlined in Exhibit 3. [Pharmacy shall provide written reports of each of the service standards set forth in Exhibit 3 within 25 days of the close of each calendar quarter.] Pharmacy further agrees that or its representatives shall have the right to audit the information contained in such reports and the records on which such reports are based, in accordance with the remaining terms and conditions of this Agreement. Pharmacy shall pay any amounts owed for failing to meet a performance guarantee by the sooner of:

232

Parent KPI: Performance Guarantee
Sub - KPI: Service Standards Report Provision Timeline
Value: 25 days
Value Context: of the close of each calendar quarter

FIG. 2

| Provider PARTICIPATION AGREEMENT | Header | ← 310

BETWEEN Provider AND Vendor

This Participation Agreement ("PA" or "Agreement")) contains the terms for the purchase and/or license of products and/or provision of services for the benefit of Provider ("Buyer"), whose address is 123 Main St, New York, New York 50505. The Enterprise Master Services Agreement ("Enterprise MSA") (CID# 654321) is incorporated into this PA.

| Paragraph |

1. Participation Agreement Exhibits | Section Header |

1.1. This PA includes the following exhibits, unless otherwise noted: | Paragraph | a. Exhibit 1 - Statement of Work
      b. Exhibit 2 - Intentionally Omitted
      c. Exhibit 3 - Intentionally Omitted 2. Term of Participation Agreement | Section Header | ← 320

2.1. This PA shall become effective on March 25, 2022 ("Agreement Effective Date") and shall end on December 31, 2025 ("Term"), except as otherwise provided herein.

2.2. Unless Buyer by its designated contract Administrator agrees in writing to an extension of time, Supplier shall complete the Services Due under this PA before the Term ends. If, at any time, Supplier concludes it will be unable to complete the Services before the end of the Term, Supplier shall promptly give the Buyer's Contract Administrator a complete explanation of the facts and reasons.

| Paragraph |

3. Termination        330

3.1. Termination for Convenience. Except as otherwise set forth in any SOW, either party may terminate this PA or any SOW, in whole or part, for its sole convenience upon ninety (90) days' prior written notice to the other party. Supplier shall be paid for services satisfactorily provided or performed prior to the effective date of termination. In no event shall Supplier be paid for costs incurred, anticipated profit, or support services performed after the effective date of termination. If this Agreement is terminated for any reason, Provider, in its sole discretion, may extend the effective date of termination for a maximum period of 12 months under the then current terms and conditions by giving Supplier written notice.

3.2. Termination by Department of Health and Human Services. Buyer may terminate this Agreement immediately if the Department of Health and Human Services ("HHS") finds that Supplier has failed to satisfactorily perform services as accordance with terms of this agreement or any SOW governed by this PA. As part of such notice, Buyer shall include documentation form HHS (e.g. copy of directive, finding, etc.) to support the basis for such termination.

| Paragraph |

Revised 10/2021 | Noise | ← 340
Contract: 987654321

300        Page 1 of 18

Technical customer support is available by telephone seven (seven) days per week, 24 hours per day.
sub – kpi                                              Value

612

Technical customer support >
seven (7) days per week, 24 hours
per day

621

Unless a shorter time frame is required by applicable law, Clean Claims shall be adjudicated and funded within fifteen (15) days for electronic claims and thirty (30) days for paper claims.
Value            sub – kpi            Value            sub – kpi

622 electronic claims > fifteen (15) days
paper claims > thirty (30) days

FIG. 6

SYSTEMS AND METHODS FOR EXTRACTING KEY PERFORMANCE INDICATORS FROM TEXTUAL DATA

TECHNICAL FIELD

Various embodiments of the present disclosure relate generally to systems and methods for extracting key performance indicators from textual data and, more particularly, to systems and methods for a domain-agnostic, vocabulary-independent, and adaptive model to digitize key performance indicators from text documents using entity recognition and relation extraction to extract and link key performance indicators.

BACKGROUND

Text documents often contain several key performance indicators (KPIs) that have certain associated values. The information in the text document may be unstructured data with differing templates or formats, and the language in text documents can vary significantly. Limiting a domain of text documents and/or using a non-generalized methods to extract and link KPIs to their values require significant resources for development and training.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques described herein relate to a method, performed by one or more processors of a computing system, for extracting a key performance indicator from textual data, the method including: determining a first bounding box in textual data, wherein the first bounding box includes text grouped by position in the textual data; categorizing the first bounding box into a paragraph category among a list of categories including a header category, a section header category, the paragraph category, and a noise category; extracting a candidate noun from the text in the categorized first bounding box, as a candidate paragraph noun; extracting a candidate value from the text in the categorized first bounding box; generating a relationship between the candidate paragraph noun and the extracted candidate value; associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

In some aspects, the techniques described herein relate to a method, wherein determining the first bounding box includes using a segmentation model.

In some aspects, the techniques described herein relate to a method, wherein the segmentation model uses image features, positional features, and text features to merge close and/or overlapping bounding boxes.

In some aspects, the techniques described herein relate to a method, wherein extracting the candidate noun from the text in the categorized first bounding box includes using part-of-speech tags to extract the candidate noun from a sentence in the textual data.

In some aspects, the techniques described herein relate to a method, wherein extracting the candidate value from the text in the categorized first bounding box includes using a pre-trained Named Entity Recognition model to extract the candidate value from a sentence in the textual data.

In some aspects, the techniques described herein relate to a method, wherein generating the relationship includes using a classification model.

In some aspects, the techniques described herein relate to a method, wherein the classification model is based on (i) word embedding of the candidate noun, (ii) word embedding of the candidate value, and (iii) averaged word embeddings of tokens present between the candidate noun and the candidate value.

In some aspects, the techniques described herein relate to a method, wherein the classification model is a binary classifier which predicts whether a relationship exists between the candidate noun and the candidate value.

In some aspects, the techniques described herein relate to a method, wherein extracting the candidate noun from the text in the categorized first bounding box includes extracting noun phrases from a sentence in the textual data.

In some aspects, the techniques described herein relate to a method, wherein generating the relationship includes filtering candidate nouns that result in redundant key performance indicators.

In some aspects, the techniques described herein relate to a method, wherein generating the key performance indicator includes standardizing the generated key performance indicator.

In some aspects, the techniques described herein relate to a method, wherein the textual data is generated by performing optical character recognition on a document.

In some aspects, the techniques described herein relate to a method, wherein the one or more processors of the computing system execute instructions for: a text extractor to generate the textual data, a segmentation generator to determine the first bounding box, a candidate noun extractor to extract the candidate noun, a candidate value extractor to extract the candidate value, a relationship generator to generate the relationship, an association generator to associate the candidate paragraph noun with the candidate header noun, and a standardization generator to generate the key performance indicator.

In some aspects, the techniques described herein relate to a system for extracting a key performance indicator from textual data, the system including: one or more processors; and at least one memory storing instructions that, when executed by the one or more processors, cause the one or more processors to perform operations including: determining a first bounding box in textual data, wherein the first bounding box includes text grouped by position in the textual data; categorizing the first bounding box into a paragraph category among a list of categories including a header category, a section header category, the paragraph category, and a noise category; extracting a candidate noun from the text in the categorized first bounding box, as a candidate paragraph noun; extracting a candidate value from the text in the categorized first bounding box; generating a relationship between the candidate paragraph noun and the extracted candidate value; associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

In some aspects, the techniques described herein relate to a system, wherein determining the first bounding box includes using a segmentation model that uses image features, positional features, and text features to optimize and merge close and overlapping bounding boxes.

In some aspects, the techniques described herein relate to a system, wherein extracting the candidate noun from the text in the categorized first bounding box includes using part-of-speech tags to extract the candidate noun from a sentence in the textual data.

In some aspects, the techniques described herein relate to a system, wherein extracting the candidate value from the text in the categorized first bounding box includes using a pre-trained Named Entity Recognition model to extract the candidate value from a sentence in the textual data.

In some aspects, the techniques described herein relate to a system, wherein generating the relationship includes using a classification model that is a binary classifier which predicts whether a relationship exists between the candidate noun and the candidate value, based on (i) word embedding of the candidate noun, (ii) word embedding of the candidate value, and (iii) averaged word embeddings of tokens present between the candidate noun and the candidate value.

In some aspects, the techniques described herein relate to a system, wherein extracting the candidate noun from the text in the categorized first bounding box includes extracting noun phrases from a sentence in the textual data.

In some aspects, the techniques described herein relate to a non-transitory computer readable medium for extracting a key performance indicator from textual data, the non-transitory computer readable medium storing instructions that, when executed by one or more processors, cause the one or more processors to perform operations including: determining a first bounding box in textual data, wherein the first bounding box includes text grouped by position in the textual data; categorizing the first bounding box into a paragraph category among a list of categories including a header category, a section header category, the paragraph category, and a noise category; extracting a candidate noun from the text in the categorized first bounding box, as a candidate paragraph noun; extracting a candidate value from the text in the categorized first bounding box; generating a relationship between the candidate paragraph noun and the extracted candidate value; associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

FIG. 2 depicts example extracted text and outputs for a key performance indicator generator, according to one or more embodiments.

FIG. 3 depicts example merged and categorized bounding boxes for a key performance indicator generator, according to one or more embodiments.

FIG. 6 depicts an example relation extraction for a key performance indicator generator, according to one or more embodiments.

DETAILED DESCRIPTION OF EMBODIMENTS

Figure 1:
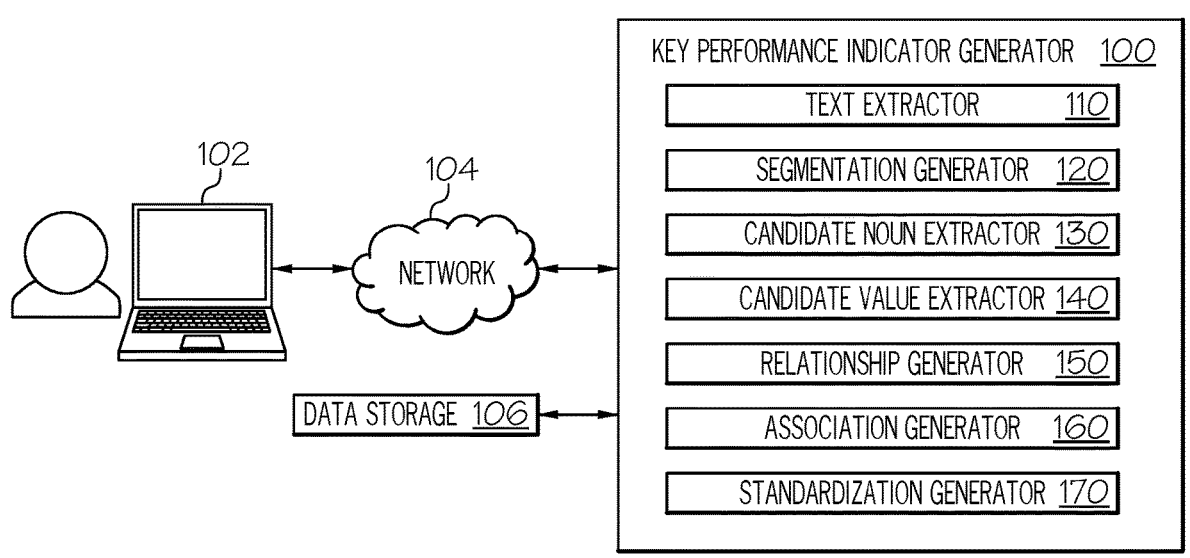
FIG. 1 depicts an example system infrastructure for a key performance indicator generator, according to one or more embodiments.

Various embodiments of the present disclosure relate generally to systems and methods for extracting key performance indicators from textual data and, more particularly, to systems and methods for a domain-agnostic, vocabulary-independent, and adaptive model to digitize key performance indicators from text documents using entity recognition and relation extraction to extract and link key performance indicators.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Text documents often contain several key performance indicators (KPIs) that have certain associated values. The information in the text document is unstructured data with differing templates or formats, and the language in text documents can vary significantly. Limiting a domain of text documents and/or using a non-generalized methods to extract and link KPIs to their values require significant resources for development and training.

One or more embodiments of the present disclosure (also referred to herein as simply "one or more embodiments") provide a system with a generalized process to extract and link key performance indicators with corresponding values. One or more embodiments provide a domain-agnostic, vocabulary-independent, and adaptive solution to digitize key performance indicators from text documents, which employs methods of entity recognition and relation extraction to extract and link key performance indicators. One or more embodiments are domain agnostic, where documents can belong to any domain. One or more embodiments process unstandardized key performance indicators, where the solution adapts and generalize to any new document and language. One or more embodiments provide a mining hierarchy, linking each key performance indicator (KPI) to a meaningful metric such as a sub-KPI to establish a hierarchy. One or more embodiments provide added context, where values have units or additional context to further a meaning of the values. One or more embodiments do not require Named Entity Recognition (NER) training, thus reducing hours of time spent training models to identify key performance indicators.

One or more embodiments receive a text document, perform optical character recognition, analyze the text using a segmentation model, extract sub-KPI candidates, extract value candidates, extract relationships between the candidates, and provide results. The segmentation model uses image features, positional features, and text features to optimize and merge close and overlapping bounding boxes. One or more embodiments use part-of-speech tags to extract all relevant noun phrases from sentences in the text document. One or more embodiments use a pre-trained Named Entity Recognition model to extract all possible quantitative values found in the sentences. One or more embodiments define each value using a unit or an additional context, which can be extracted using a part-of-speech tag dependency graph.

One or more embodiments extract each sub-KPI candidate from a sentence to be linked to a value candidate. One or more embodiment use a classification model to predict whether there is a possible relationship between the sub-KPI candidate and the value candidate. The classification model is based on (i) word embedding of the sub-KPI candidate, (ii) word embedding of the value candidate, and (iii) averaged word embeddings of the tokens present between the two.

One or more embodiments provide a generalized way to understand the elements of a document using a segmentation model, which extracts and links paragraphs to their section-header. One or more embodiments provide an adaptive, fast, and scalable system to extract any key performance indicators (KPIs) using part-of-speech tags. One or more embodiments provide a robust way to link KPIs with their values by accounting for the context present, thus addressing several language challenges like active and passive sentences. One or more embodiments provide a scalable approach to extract and link key performance indicators in any given text document.

One or more embodiments achieve and bring together a generalized, vocabulary-independent, document template-agnostic method to extract and link key performance indicators. One or more embodiments extract key performance indicator candidates using noun phrases so that the disclosed system can be applied to any document. Also, by being able to extract the parent KPI (using document segmentation approach), the unit of measurement, and the name standardization, one or more embodiments are able to generate contextually complete and meaningful results for digitization of unstructured text data and convert the results to standardized data.

Some conventional solutions that extract key performance indicators are restricted to form-like (e.g., structured) documents only. One or more embodiments deconstruct and digitize any text document in a manner that enables extraction of key performance indicators and value pairs.

Some conventional solutions use a domain-specific approach, which requires the solutions to have a custom vocabulary for finding KPIs. These solutions are limited to the domain in which they reside. One or more embodiments use noun-phrases to find KPIs that are generalizable across any document type. Further, even though noun-phrases may end up giving redundant KPIs, one or more embodiments filter these redundant KPIs out in the relationship extraction process, so that only KPIs with values associated with them remain.

One or more embodiments use noun-phrases and downstream relationship extraction. The relationship extraction is based on a complex feature vector, which is a numerical representation (word embeddings) of noun-phrase (KPI candidate), value candidate, and the span of words present between the KPI candidate and value candidate. The model is a binary classifier which predicts whether a relationship exists between the KPI candidate and value candidate.

One or more embodiments that provide a generalized, domain-independent way to extract and link KPIs to their values include a seven step process. In a first step, input documents are passed through OCR to extract text tokens and their bounding documents. In a second step, a Segmentation Model categorizes elements of the document into four categories, such as Paragraph, Section Header, Sub-Section Header, and Noise, for example. In a third step, Candidate Extraction for sub-KPI, each sentence in the document can be assumed to contain several key performance indicators.

In a fourth step, Candidate Extraction for Value, each sub-KPI found in a sentence is associated with a value. In a fifth step, Relationship Extraction, each sub-KPI candidate extracted from a sentence is linked to a value candidate. In a sixth step, Parent KPI Extraction, each sub-KPI extracted in step 4 is associated with a parent indicator, which can be termed as KPI. A KPI for any sub-KPI can be extracted using the "section header"/"sub-section header" of the paragraph from which the sub-KPI has been extracted. In a seventh step, Name Generation and Standardization, one or more embodiments generate human readable and meaningful names for the above sub-KPI candidates, by using the "Root Verb" converted to the closest noun, and also incorporate the type of paired value.

FIG. 1 depicts an example system infrastructure for a key performance indicator generator, according to one or more embodiments. As shown in FIG. 1, client device 102 communicates with key performance indicator generator 100 over network 104. Data storage 106 communicates directly with key performance indicator generator 100 as shown in FIG. 1, or communicates with key performance indicator generator 100 over network 104. Key performance indicator generator 100 includes text extractor 110, segmentation generator 120, candidate noun extractor 130, candidate value extractor 140, relationship generator 150, association generator 160, and standardization generator 170.

Key performance indicator generator 100 provides a generalized process to extract and link key performance indicators with corresponding values. Key performance indicator generator 100 provides a domain-agnostic, vocabulary-independent, and adaptive solution to digitize key performance indicators from text documents, and employs methods of entity recognition and relation extraction to extract and link key performance indicators. Key performance indicator generator 100 is domain agnostic, where documents can belong to any domain. Key performance indicator generator 100 processes unstandardized key performance indicators, where the solution adapts to generalize to any new document and language. Key performance indicator generator 100 provides a mining hierarchy, linking each key performance indicator (KPI) to a meaningful metric such as a sub-KPI to establish a hierarchy. Key performance indicator generator 100 provides added context, where values have units or additional context to further a meaning of the values. Key performance indicator generator 100 does not require Named Entity Recognition (NER) training, thus reducing hours of time spent training models to identify key performance indicators.

Text extractor 110 extracts text from a text document, such as by using optical character recognition, for example, along with bounding boxes that divide the text into related portions. Segmentation generator 120 uses image features, positional features, and text features to optimize and merge close and overlapping bounding boxes, and to assign categories to the bounding boxes (e.g. see FIG. 3). Candidate noun extractor 130 uses part-of-speech tags to extract all relevant nouns and/or noun phrases from sentences in the text document (e.g. see FIG. 4). Candidate value extractor 140 uses a pre-trained Named Entity Recognition model to extract all possible quantitative values found in the sentences (e.g. see FIG. 5).

Relationship generator 150 uses a classification model to predict whether there is a possible relationship between the extracted nouns and the possible quantitative values (e.g. see FIG. 6). Association generator 160 uses the assigned categories to generate associations between the extracted nouns and a heading of the noun from the assigned categories. Standardization generator 170 generates contextually complete and meaningful results for digitization of the text data from the association generator 160 and converts the results to standardized data.

FIG. 2 depicts example extracted text and outputs for a key performance indicator generator, according to one or more embodiments. As shown in FIG. 2, key performance indicator generator 100 extracts text in the form 211 and generates output 212. Form 211 includes text from an unstructured text document. The text in form 211 is in sentence form with a heading "payment terms". The text in output 212 is in a summary form. The text in output 212 provides a parent key performance indicator based on the heading "payment terms". The text in output 212 provides a subordinate key performance indicator based on a standardized noun phrase from the text. For example, "clean Claims submitted" is standardized to "Clean Claims Submission" with the addition of the noun "Timeline" based on the 30-day value. For example, the standardization uses a library to convert a verb form of a term to a noun form of the term. Other standardized terms are added as needed, such as a timeline, dollar, or percent, for example, which are extracted from a named-entity recognition model. The text in output 212 provides a value of "Thirty (30) days" according to the "thirty (30) days" value associated with the sub-KPI. The text in output 212 provides a value context of "of receipt" to further describe the value of "Thirty (30) days". The value context is generated using a parse tree, for example.

Key performance indicator generator 100 extracts text in the form 221 and generates output 222. Form 221 includes text from an unstructured text document. The text in form 221 is in sentence form with a heading "PAYMENT". The text in output 222 is in a summary form. The text in output 222 provides a subordinate key performance indicator based on a standardized noun phrase from the text. For example, "all electronic claims submitted" is standardized to "electronic claims submission" with the addition of the noun "timeline" based on the 90-day value. The text in output 222 provides a value of "ninety (90) days" according to the value associated with the sub-KPI. The text in output 222 provides a value context of "after the prescription is filled" to further describe the value of "ninety (90) days".

Key performance indicator generator 100 extracts text in the form 231 and generates output 232. Form 231 includes text from an unstructured text document. The text in form 231 is in sentence form. The text in output 232 is in a summary form. The text in output 232 provides a parent key performance indicator based on a heading "Performance Guarantee" (not shown). The text in output 232 provides a subordinate key performance indicator based on a standardized noun phrase from the text. For example, the text is standardized to "Service Standards Report Provision" with the addition of the noun "Timeline" based on the 25-day value. The text in output 232 provides a value of "25 days" according to the "25 days" value associated with the sub-KPI. The text in output 232 provides a value context of "of the close of each calendar quarter" to further describe the value of "25 days".

FIG. 3 depicts example merged and categorized bounding boxes for a key performance indicator generator, according to one or more embodiments. As shown in FIG. 3, key performance indicator generator 100 determines a bounding box by merging text and/or bounding boxes, and categorizing text in an input text document as shown in bounding box output 300. For example, bounding box output 300 includes one or more bounding boxes around portions or elements of the text, and each bounding box is associated with a category, such as, e.g., header 310, section header 320, paragraph 330, or noise 340. In another example, each bounding box is associated with a category, such as, e.g., Paragraph, Section Header, Sub-Section Header, and Noise. Segmentation generator 120 provides a generic way to understand the elements of a document using a segmentation model, which extracts and links paragraphs (330) to their section-header (310 and/or 320).

Text extractor 110 extracts text from a text document, such as by using optical character recognition, for example, along with bounding boxes that divide the text into related portions. Segmentation generator 120 uses image features, positional features, and text features to optimize and merge close and overlapping bounding boxes, and to assign categories to the bounding boxes, such as, e.g., header 310, section header 320, paragraph 330, and noise 340. A document generally includes large text portions, which can be termed as "paragraphs". Each paragraph is associated with a title, which can be termed as "sub-section header", and each "sub-section header" is associated with a parent title "section header". The other elements of this document are classified as "noise".

One or more embodiments provide a complex methodology to combine bounding boxes, which brings together bounding boxes of tokens in proximity. The bounding boxes from OCR are at a line level, and the merging operation groups these bounding boxes to generate a bounding box for an entire entity, such as a paragraph, for example. The merging operation combines multiple adjacent bounding boxes to generate a single bounding box for an entire entity. One or more embodiments merge lines of text together to generate and label bounding boxes of paragraph, section-header, header, etc. OCR generates bounding boxes for each line of text found within the document. Each line in itself holds no meaning, and thus the bounding boxes that are in proximity or have a certain overlap threshold are combined. One or more embodiments compute intersection over union (IOU) as well to merge bounding boxes together. These merged bounding boxes, along with text information, and several text features derived from the information, are passed to a downstream classifier to label them into header, paragraph, section-header, or noise. Bounding boxes contain text (extracted via OCR) and positional coordinates, and these features are combined with several text features such as number of tokens, number of capital cased alphabets, and certain image based features such as pixel density, for example. This enables the representation of each bounding box using the text and image features from the bounding boxes.

These merged bounding boxes are then passed through a classification model (such as a machine-learning model, for example) to categorize each element into the respective labels. The representation described above is passed to a downstream classifier to categorize into paragraph, header, section-header, or noise. This model is based on text properties such as font size or bounding box size, for example, as well as image properties of the document, such as pixel density, for example. In some embodiments, the classification model is a gradient boosting model, and/or a multi-class classifier. In one embodiment, the feature vector size is 112, with four labels: noise, header, section-header, and paragraph.

As shown in FIG. 3 with reference to FIGS. 1 and 2, key performance indicator generator 100 uses header 310 and/or section header 320 to generate a parent key performance indicator, key performance indicator generator 100 uses paragraph 330 to generate subordinate key performance indicator and value, and key performance indicator generator 100 ignores noise 340.

Figure 4:
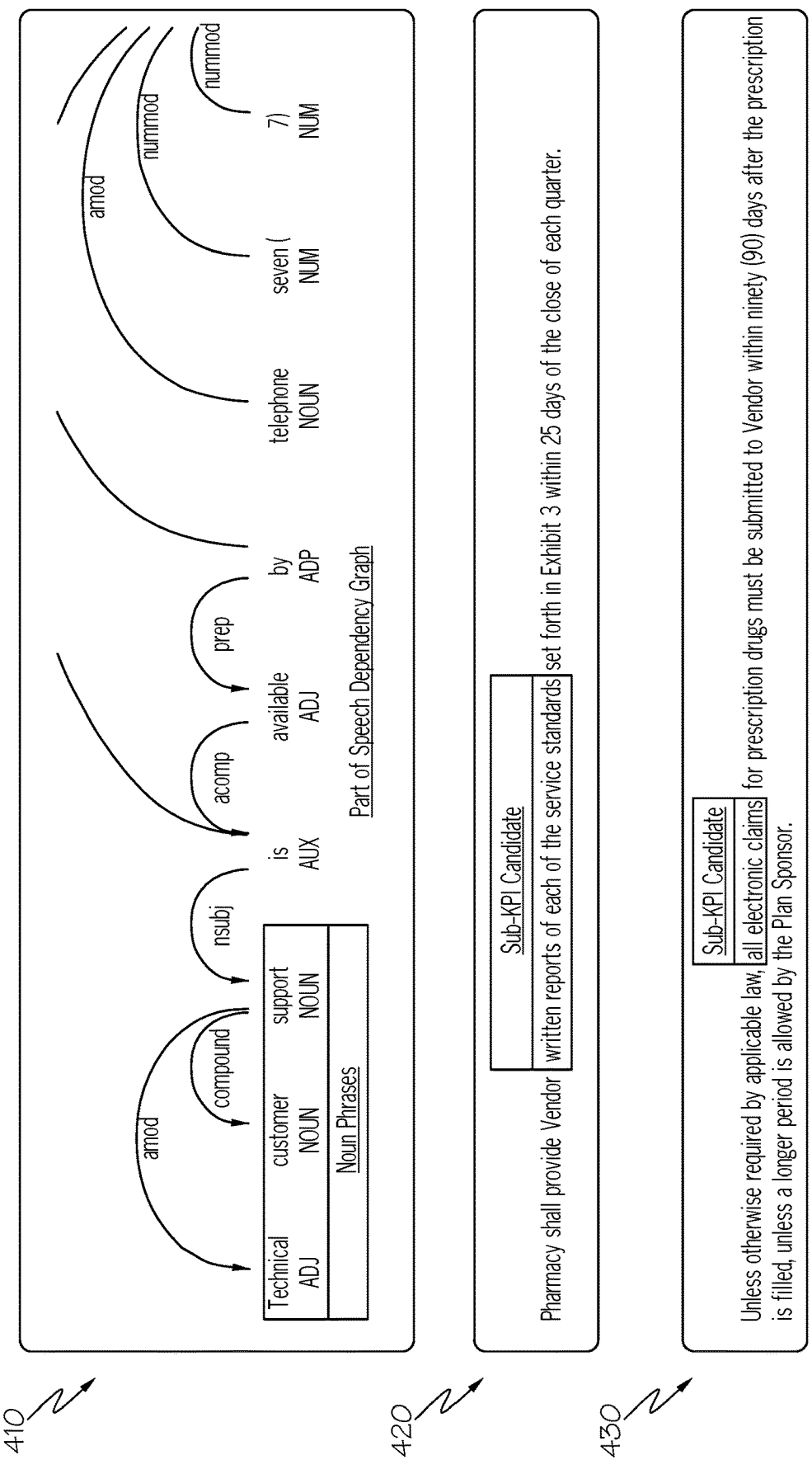
FIG. 4 depicts an example part-of-speech dependency graph for sub-KPI candidates for a key performance indicator generator, according to one or more embodiments.

FIG. 4 depicts an example part-of-speech dependency graph for sub-KPI candidates for a key performance indicator generator, according to one or more embodiments. As shown in FIG. 4, key performance indicator generator 100 uses part-of-speech dependency graph 410 to identify noun phrases. Key performance indicator generator 100 extracts sub-KPI candidates such as sub-KPI candidate example 420 or sub-KPI candidate example 430, for example. Candidate noun extractor 130 uses part-of-speech tags to extract all relevant nouns and/or noun phrases from sentences in the text document. Candidate noun extractor 130 provides an adaptive, fast, and scalable system to extract any key performance indicators (KPIs) using part-of-speech tags. Candidate noun extractor 130 provides a scalable approach to extract and link key performance indicators in any given text document. Candidate noun extractor 130 uses noun-phrases to find KPIs that are generalizable across any document type.

The dependency graph provides relationships between different words in a sentence. Part of speech (POS) tags provide nouns in a sentence, and the modifier relationships with the nouns from the dependency graph provide noun phrases. Nouns and noun phrases are considered as candidate KPIs in the model.

One or more embodiments provide a vocabulary independent method to extract these indicators using part of speech (POS) tags. These indicators are generally a combination of two words and/or tokens, and by plotting the POS dependency graph (which is a graph representing the connections each POS tag has with the other), these indicators are categorized into compound nouns or noun phrases.

One or more embodiments utilize compound nouns or noun-phrases to extract key performance indicators present in the sentence. Other approaches to tag possible key performance indicators utilize training a complex named-entity recognition model. One or more embodiments provide a simplified approach to extract all possible KPIs using all possible noun phrases in the sentence. As part of a relationship extraction step described below, several of these noun phrases are made redundant as they don't have a value associated with them.

Any indicator found in a sentence is labelled as a "sub-KPI", based on the assumption that this indicator is associated with a parent indicator found elsewhere in the document (such as in the "section header" associated with this sentence, for example). An example sentence may be: "Technical customer support is available by telephone seven (7) days per week, 24 hours per day." In this sentence, the possible indicators extracted via noun phrase is "Technical customer support."

Figure 5:
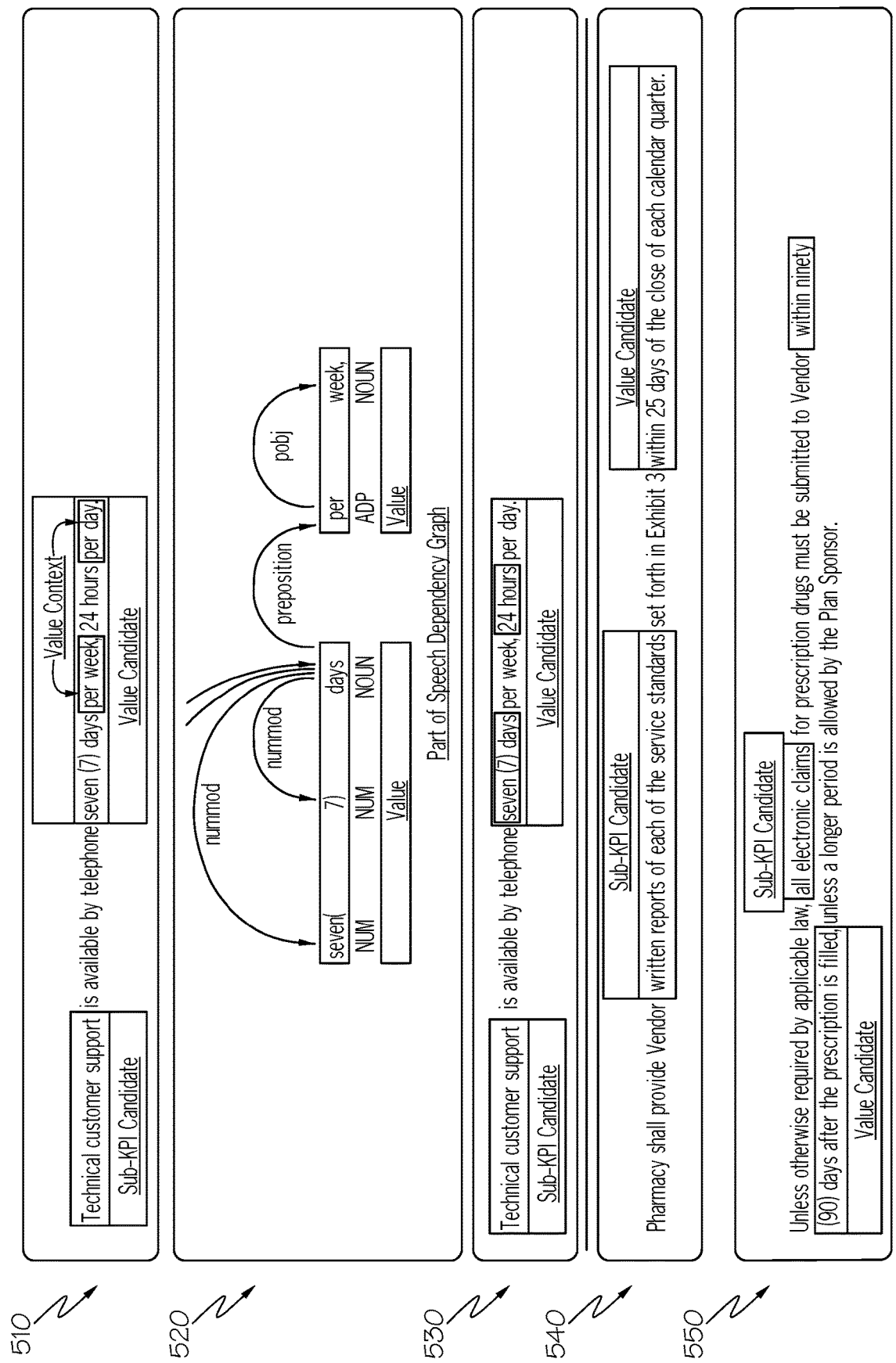
FIG. 5 depicts an example part-of-speech dependency graph for value candidates for a key performance indicator generator, according to one or more embodiments.

FIG. 5 depicts an example part-of-speech dependency graph for value candidates for a key performance indicator generator, according to one or more embodiments. As shown in FIG. 5, key performance indicator generator 100 uses part-of-speech dependency graph 520 to identify value candidates. Key performance indicator generator 100 extracts value candidates such as value candidate example 510, value candidate example 530, value candidate example 540, or value candidate example 550, for example. Candidate value extractor 140 uses a pre-trained Named Entity Recognition model to extract all possible quantitative values found in the sentences. The values from a sentence are extracted using a pre-trained Named Entity Recognition model to provide values such as time, dollars, and percent, for example.

Again, the example sentence may be: "Technical customer support is available by telephone seven (7) days per week, 24 hours per day." Here, the values for "Technical Customer Support Availability" are "seven (7) days" and "24 hours". The values for any given indicator can either be a quantitative value (such as a dollar value, time, or percentage, for example) or a qualitative value (such as an Organization's Name or Person's Name, for example). These values can be extracted using a Named Entity Recognition (NER) Model.

Each value is also associated with a context or a unit of measurement. For example, "seven (7) days" is associated with "per week" and "24 hours" is associated with "per day". This extraction provides meaning from the value candidate. One or more embodiments utilize the POS tags to understand the nouns connected to the value via a preposition.

FIG. 6 depicts an example relation extraction for a key performance indicator generator, according to one or more embodiments. As shown in FIG. 6, key performance indicator generator 100 extracts relationships from text. Key performance indicator generator 100 extracts relationships such as relationship example 612 from text 611, or extracts relationships such as relationship example 622 from text 621, for example. Relationship generator 150 uses a classification model to predict whether there is a possible relationship between the extracted nouns and the possible quantitative values. The classification model is a binary classifier which predicts whether a relationship exists between the KPI candidate and value candidate. A feature vector is created for each KPI candidate and value candidate pair. The classification model is used to determine whether a KPI-Value relationship exists between each KPI candidate and value candidate pair.

Relationship generator 150 uses a classification model to predict whether there is a possible relationship between the sub-KPI candidate and the value candidate. The classification model is based on (i) word embedding of the sub-KPI candidate, (ii) word embedding of the value candidate, and (iii) averaged word embeddings of the tokens present between the two (e.g., between the sub-KPI candidate and the value candidate). Relationship generator 150 provides a robust way to link KPIs with their values by accounting for the context present, tackling several language challenges like active and passive sentences. Relationship generator 150 uses a relationship extraction process to filter noun-phrases that result in redundant KPIs, as only KPIs with associated values are considered KPIs. The filtering process is a result of the classification model where the KPIs that do not have a relationship with a value are removed because these KPIs do not have a KPI-Value relationship.

One or more embodiments predict whether there is a possible relationship between the two using a classification model based on the word embedding of the sub-KPI candidate, the value candidate, and the averaged word embeddings of the tokens present between the two. Again, the example sentence may be: "Technical customer support is available by telephone seven (7) days per week, 24 hours per day." Here, the sub-KPI candidate is "Technical customer support", the value candidates are "seven (7) days per week" and "24 hours per day", and the tokens present between the two are "is available by telephone." This model provides all possible sub-KPI/value pairs that are present in the sentence.

In Parent KPI Extraction, each extracted sub-KPI is associated with a parent indicator, which can be termed as KPI. A KPI for any sub-KPI can be extracted using the "section header"/"sub-section header" of the paragraph from which the sub-KPI has been extracted.

In Name Generation and Standardization, one or more embodiments generate human readable and meaningful names for the above sub-KPI candidates, by using the "Root Verb" converted to the closest noun, and also incorporate the type of paired value. Again, the example sentence may be: "Technical customer support is available by telephone seven (7) days per week, 24 hours per day." Here, the parent KPI is "Telephone Support", the sub-KPI candidate is "Technical customer support", the root verb is "available", the closest noun is "Availability", the value candidate is "seven (7) days per week, 24 hours per day", the value type is "Time", and the name generated is "Technical Customer Support Availability Time."

Figure 7:
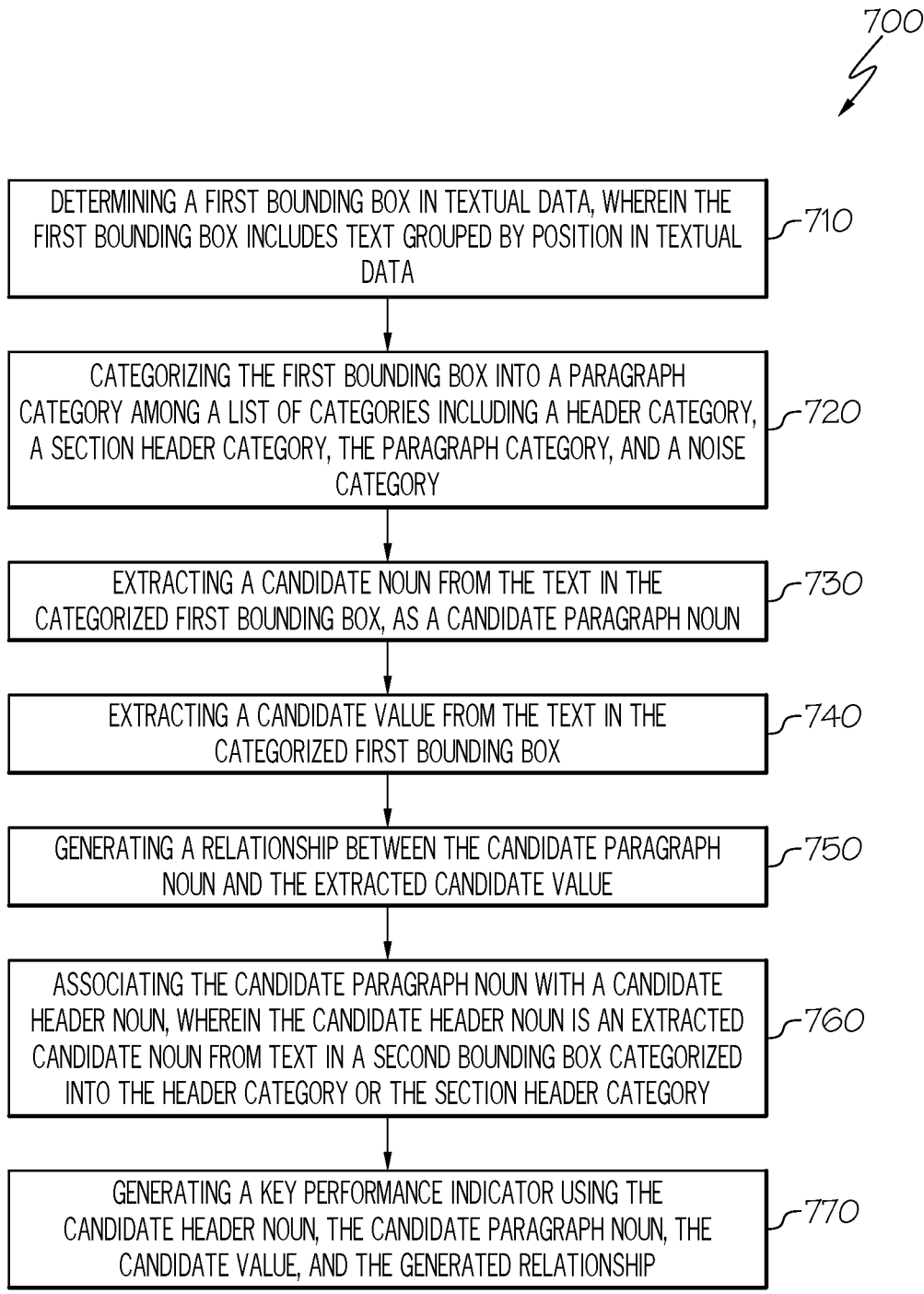
FIG. 7 depicts a flowchart of a method of extracting key performance indicators from textual data, according to one or more embodiments.

FIG. 7 depicts a flowchart of a method 700 of extracting key performance indicators from textual data, according to one or more embodiments. Method 700 is performed by one or more processors of a computing system, and includes various operations. For example, method 700 is performed by one or more processors that execute the functionalities of key performance indicator generator 100 (or of the components in key performance indicator generator 100 shown in FIG. 1). The textual data is generated by performing optical character recognition on a document.

Method 700 includes determining a first bounding box in the textual data, wherein the first bounding box includes text grouped by position in the textual data (operation 710). Determining the first bounding box includes using a segmentation model. The segmentation model uses image features, positional features, and text features to optimize and merge close and overlapping bounding boxes.

Method 700 includes categorizing the first bounding box into a paragraph category among a list of categories including at least one of: a header category, a section header category, the paragraph category, or a noise category (operation 720).

Method 700 includes extracting a candidate noun from the text in the categorized first bounding box, as a candidate paragraph noun (operation 730). Extracting the candidate noun from the text in the categorized first bounding box includes using part-of-speech tags to extract the candidate noun from a sentence in the textual data. Extracting the candidate noun from the text in the categorized first bounding box includes extracting noun phrases from a sentence in the textual data.

Method 700 includes extracting a candidate value from the text in the categorized first bounding box (operation 740). Extracting the candidate value from the text in the categorized first bounding box includes using a pre-trained Named Entity Recognition model to extract the candidate value from a sentence in the textual data.

Method 700 includes generating a relationship between the candidate paragraph noun and the extracted candidate value (operation 750). Generating the relationship includes using a classification model. The classification model is based on (i) word embedding of the candidate noun, (ii) word embedding of the candidate value, and (iii) averaged word embeddings of tokens present between the candidate noun and the candidate value. The classification model is a binary classifier which predicts whether a relationship exists between the candidate noun and the candidate value. Generating the relationship includes filtering candidate nouns that result in redundant key performance indicators.

Method 700 includes associating the candidate paragraph noun with a candidate header noun, wherein the candidate header noun is an extracted candidate noun from text in a second bounding box categorized into the header category or the section header category (operation 760).

Method 700 includes generating the key performance indicator using at least one of: the candidate header noun, the candidate paragraph noun, the candidate value, or the generated relationship (operation 770). Generating the key performance indicator includes standardizing the generated key performance indicator.

As discussed above, method 700 may be performed by one or more processors that execute the functionalities of key performance indicator generator 100, or each of the components therein including: a text extractor to generate the textual data, a segmentation generator to determine the first bounding box, a candidate noun extractor to extract the candidate noun, a candidate value extractor to extract the candidate value, a relationship generator to generate the relationship, an association generator to associate the candidate paragraph noun with the candidate header noun, and a standardization generator to generate a key performance indicator.

One or more components of the client device 102 generate, or cause to be generated, one or more graphical user interfaces (GUIs) based on the generated key performance indicator and/or other component of method 700, and cause the GUIs to be displayed via a display (e.g. display 810) of the client device 102. The GUIs can be, e.g., mobile application interfaces or browser user interfaces and include text, input text boxes, selection controls, and/or the like. In some examples, the display includes a touch screen or a display with other input systems (e.g., a mouse, keyboard, etc.) to control the functions of the client device 102.

For example, one or more components of the client device 102 generates a GUI on which a user can search for a KPI. Based on the operations of method 700, the GUI displays KPI-value pairs for different contracts and clients. One or more components of the client device 102 generates a GUI for comparing clients and contracts for different KPIs.

Figure 8:
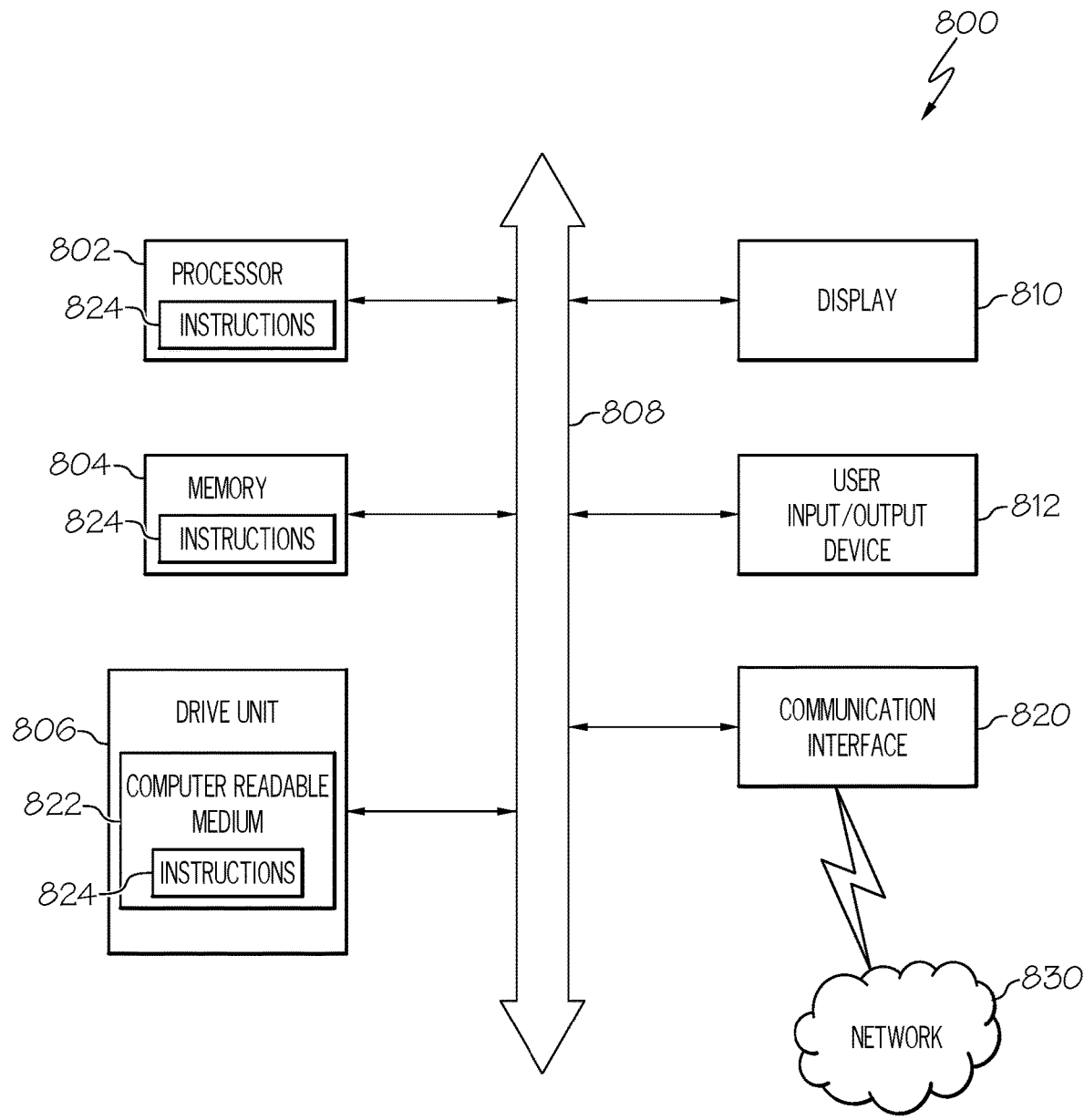
FIG. 8 depicts an implementation of a computer system that executes techniques presented herein, according to one or more embodiments.

FIG. 8 depicts an implementation of a computer system that executes techniques presented herein, according to one or more embodiments. Computer system 800 can include a set of instructions that can be executed to cause the computer system 800 to perform any one or more of the methods or computer-based functions disclosed herein. The computer system 800 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 800 operates in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while the computer system 800 is illustrated as a single system, the term "system" shall also be taken to include any collection of systems or sub-systems that individually or jointly execute a set, or multiple sets, of instructions to perform one or more computer functions.

As illustrated in FIG. 8, the computer system 800 includes a processor 802, e.g., a central processing unit (CPU), a graphics processing unit (GPU), or both. The processor 802 can be a component in a variety of systems. For example, the processor 802 is part of a standard personal computer or a workstation. The processor 802 is one or more processors, digital signal processors, application specific integrated circuits, field programmable gate arrays, servers, networks, digital circuits, analog circuits, combinations thereof, or other now known or later developed devices for analyzing and processing data. The processor 802 implements a software program, such as code generated manually (e.g., programmed).

The computer system 800 includes a memory 804 that can communicate via a bus 808. The memory 804 is a main memory, a static memory, or a dynamic memory. The memory 804 includes, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like.

In one implementation, the memory 804 includes a cache or random-access memory for the processor 802. In alternative implementations, the memory 804 is separate from the processor 802, such as a cache memory of a processor, the system memory, or other memory. The memory 804 can be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein are performed by the processor 802 executing the instructions stored in the memory 804. The functions, acts or tasks are independent of the particular type of instructions set, storage media, processor or processing strategy and are performed by software, hardware, integrated circuits, firm-ware, micro-code and the like, operating alone or in combination. Likewise, processing strategies can include multiprocessing, multitasking, parallel processing, and the like.

As shown, the computer system 800 further included a display 810, such as a liquid crystal display (LCD), an organic light emitting diode (OLED), a flat panel display, a solid-state display, a cathode ray tube (CRT), a projector, a printer or other now known or later developed display device for outputting determined information. The display 810 acts as an interface for the user to see the functioning of the processor 802, or specifically as an interface with the software stored in the memory 804 or in a drive unit 806.

Additionally or alternatively, the computer system 800 includes an input/output device 812 configured to allow a user to interact with any of the components of the computer system 800. The input/output device 812 is a number pad, a keyboard, or a cursor control device, such as a mouse, or a joystick, touch screen display, remote control, or any other device operative to interact with the computer system 800.

The computer system 800 also or alternatively includes the drive unit 806 implemented as a disk or optical drive. The drive unit 806 includes a computer-readable medium 822 in which one or more sets of instructions 824, e.g., software, can be embedded. Further, the sets of instructions 824 embody one or more of the methods or logic as described herein. The instructions 824 reside completely or partially within the memory 804 and/or within the processor 802 during execution by the computer system 800. The memory 804 and the processor 802 can also include computer-readable media as discussed above.

In some systems, the computer-readable medium 822 includes the sets of instructions 824 or receives and executes the sets of instructions 824 responsive to a propagated signal so that a device connected to a network 830 can communicate voice, video, audio, images, or any other data over the network 830. Further, the sets of instructions 824 are transmitted or received over the network 830 via a communication port or interface 820, and/or using the bus 808. The communication port or interface 820 is a part of the processor 802 or is a separate component. The communication port or interface 820 is created in software or is a physical connection in hardware. The communication port or interface 820 are configured to connect with the network 830, external media, the display 810, or any other components in the computer system 800, or combinations thereof. The connection with the network 830 is a physical connection, such as a wired Ethernet connection or is established wirelessly as discussed below. Likewise, the additional connections with other components of the computer system 800 are physical connections or are established wirelessly. The network 830 is alternatively directly connected to the bus 808.

While the computer-readable medium 822 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that cause a computer system to perform any one or more of the methods or operations disclosed herein. In some examples, the computer-readable medium 822 is non-transitory, and is tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives are considered a distribution medium that is a tangible storage medium. Accordingly, the disclosure is considered to include any one or more of a computer-readable medium or a distribution medium and other equivalents and successor media, in which data or instructions are storable.

In an alternative implementation, dedicated hardware implementations, such as application specific integrated circuits, programmable logic arrays and other hardware devices, can be constructed to implement one or more of the methods described herein. Applications that include the apparatus and systems of various implementations can broadly include a variety of electronic and computer systems. One or more implementations described herein implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 is connected to the network 830. The network 830 defines one or more networks including wired or wireless networks, such as the network 104 described in FIG. 1. The wireless network can be a cellular telephone network, an 802.11, 802.18, 802.20, or WiMAX network. Further, such networks include a public network, such as the Internet, a private network, such as an intranet, or combinations thereof, and utilize a variety of networking protocols now available or later developed including, but not limited to TCP/IP based networking protocols. The network 830 can include wide area networks (WAN), such as the Internet, local area networks (LAN), campus area networks, metropolitan area networks, a direct connection such as through a Universal Serial Bus (USB) port, or any other networks that allow for data communication. The network 830 is configured to couple one computing device to another computing device to enable communication of data between the devices. The network 830 generally is enabled to employ any form of machine-readable media for communicating information from one device to another. The network 830 includes communication methods by which information may travel between computing devices. The network 830 can be divided into sub-networks. The sub-networks allow access to all of the other components connected thereto or the sub-networks restrict access between the components. The network 830 can be regarded as a public or private network connection and can include, for example, a virtual private network or an encryption or other security mechanism employed over the public Internet, or the like.

It will be understood that the steps of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure is implementable using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention can be practiced without these specific details. In other instances, well-known methods, structures, and techniques have not been shown in detail in order not to obscure an understanding of this description.

Thus, while there has been described what are believed to be the preferred embodiments of the invention, those skilled in the art will recognize that other and further modifications can be made thereto without departing from the spirit of the invention, and it is intended to claim all such changes and modifications as falling within the scope of the invention. For example, any formulas given above are merely representative of procedures that can be used. Functionality can be added or deleted from the block diagrams and operations are interchangeable among functional blocks. Steps can be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure further relates to the following aspects.

Example 1. A method, performed by one or more processors of a computing system, for extracting a key performance indicator from textual data, the method comprising: determining a first bounding box in textual data, wherein the first bounding box includes text grouped by position in the textual data; categorizing the first bounding box into a paragraph category among a list of categories including a header category, a section header category, the paragraph category, and a noise category; extracting a candidate noun from the text in the categorized first bounding box, as a candidate paragraph noun; extracting a candidate value from the text in the categorized first bounding box; generating a relationship between the candidate paragraph noun and the extracted candidate value; associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

Example 2. The method of any of the previous examples, wherein determining the first bounding box includes using a segmentation model.

Example 3. The method of example 2, wherein the segmentation model uses image features, positional features, and text features to merge close and/or overlapping bounding boxes.

Example 4. The method of any of the previous examples, wherein extracting the candidate noun from the text in the categorized first bounding box includes using part-of-speech tags to extract the candidate noun from a sentence in the textual data.

Example 5. The method of any of the previous examples, wherein extracting the candidate value from the text in the categorized first bounding box includes using a pre-trained Named Entity Recognition model to extract the candidate value from a sentence in the textual data.

Example 6. The method of any of the previous examples, wherein generating the relationship includes using a classification model.

Example 7. The method of example 6, wherein the classification model is based on (i) word embedding of the candidate noun, (ii) word embedding of the candidate value, and (iii) averaged word embeddings of tokens present between the candidate noun and the candidate value.

Example 8. The method of example 7, wherein the classification model is a binary classifier which predicts whether a relationship exists between the candidate noun and the candidate value.

Example 9. The method of any of the previous examples, wherein extracting the candidate noun from the text in the categorized first bounding box includes extracting noun phrases from a sentence in the textual data.

Example 10. The method of any of the previous examples, wherein generating the relationship includes filtering candidate nouns that result in redundant key performance indicators.

Example 11. The method of any of the previous examples, wherein generating the key performance indicator includes standardizing the generated key performance indicator.

Example 12. The method of any of the previous examples, wherein the textual data is generated by performing optical character recognition on a document.

Example 13. The method of example 12, wherein the one or more processors of the computing system execute instructions for: a text extractor to generate the textual data, a segmentation generator to determine the first bounding box, a candidate noun extractor to extract the candidate noun, a candidate value extractor to extract the candidate value, a relationship generator to generate the relationship, an association generator to associate the candidate paragraph noun with the candidate header noun, and a standardization generator to generate the key performance indicator.

Example 14. A system for extracting a key performance indicator from textual data, the system comprising: one or more processors; and at least one memory storing instructions that, when executed by the one or more processors, cause the one or more processors to perform operations including: determining a first bounding box in textual data, wherein the first bounding box includes text grouped by position in the textual data; categorizing the first bounding box into a paragraph category among a list of categories including a header category, a section header category, the paragraph category, and a noise category; extracting a candidate noun from the text in the categorized first bounding box, as a candidate paragraph noun; extracting a candidate value from the text in the categorized first bounding box; generating a relationship between the candidate paragraph noun and the extracted candidate value; associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

Example 15. The system of example 14, wherein determining the first bounding box includes using a segmentation model that uses image features, positional features, and text features to optimize and merge close and overlapping bounding boxes.

Example 16. The system of any of examples 14-15, wherein extracting the candidate noun from the text in the categorized first bounding box includes using part-of-speech tags to extract the candidate noun from a sentence in the textual data.

Example 17. The system of any of examples 14-16, wherein extracting the candidate value from the text in the categorized first bounding box includes using a pre-trained Named Entity Recognition model to extract the candidate value from a sentence in the textual data.

Example 18. The system of any of examples 14-17, wherein generating the relationship includes using a classification model that is a binary classifier which predicts whether a relationship exists between the candidate noun and the candidate value, based on (i) word embedding of the candidate noun, (ii) word embedding of the candidate value, and (iii) averaged word embeddings of tokens present between the candidate noun and the candidate value.

Example 19. The system of any of examples 14-18, wherein extracting the candidate noun from the text in the categorized first bounding box includes extracting noun phrases from a sentence in the textual data.

Example 20. A non-transitory computer readable medium for extracting a key performance indicator from textual data, the non-transitory computer readable medium storing instructions that, when executed by one or more processors, cause the one or more processors to perform operations comprising: determining a first bounding box in textual data, wherein the first bounding box includes text grouped by position in the textual data; categorizing the first bounding box into a paragraph category among a list of categories including a header category, a section header category, the paragraph category, and a noise category; extracting a candidate noun from the text in the categorized first bounding box, as a candidate paragraph noun; extracting a candidate value from the text in the categorized first bounding box; generating a relationship between the candidate paragraph noun and the extracted candidate value; associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, performed by one or more processors of a computing system, for extracting a key performance indicator from textual data, the method comprising:
   determining a first bounding box in textual data, wherein the first bounding box includes text grouped by position in the textual data;
   categorizing the first bounding box into a paragraph category among a list of categories including a header category, a section header category, the paragraph category, and a noise category;
   extracting a candidate noun from the text in the categorized first bounding box, as a candidate paragraph noun;
   extracting a candidate value from the text in the categorized first bounding box;
   generating a relationship between the candidate paragraph noun and the extracted candidate value;
   associating the candidate paragraph noun with a candidate header noun, wherein the candidate header noun is an extracted candidate noun from text in a second bounding box categorized into the header category or the section header category; and
   generating a key performance indicator using the candidate header noun, the candidate paragraph noun, the candidate value, and the generated relationship.

2. The method of claim 1, wherein determining the first bounding box includes using a segmentation model.

3. The method of claim 2, wherein the segmentation model uses image features, positional features, and text features to merge close and/or overlapping bounding boxes.

4. The method of claim 1, wherein extracting the candidate noun from the text in the categorized first bounding box includes using part-of-speech tags to extract the candidate noun from a sentence in the textual data.

5. The method of claim 1, wherein extracting the candidate value from the text in the categorized first bounding box includes using a pre-trained Named Entity Recognition model to extract the candidate value from a sentence in the textual data.

6. The method of claim 1, wherein generating the relationship includes using a classification model.

7. The method of claim 6, wherein the classification model is based on (i) word embedding of the candidate noun, (ii) word embedding of the candidate value, and (iii) averaged word embeddings of tokens present between the candidate noun and the candidate value.

8. The method of claim 7, wherein the classification model is a binary classifier which predicts whether a relationship exists between the candidate noun and the candidate value.

9. The method of claim 1, wherein extracting the candidate noun from the text in the categorized first bounding box includes extracting noun phrases from a sentence in the textual data.

10. The method of claim 1, wherein generating the relationship includes filtering candidate nouns that result in redundant key performance indicators.

11. The method of claim 1, wherein generating the key performance indicator includes standardizing the generated key performance indicator.

12. The method of claim 1, wherein the textual data is generated by performing optical character recognition on a document.

13. The method of claim 12, wherein the one or more processors of the computing system execute instructions for:
   a text extractor to generate the textual data,
   a segmentation generator to determine the first bounding box,
   a candidate noun extractor to extract the candidate noun,
   a candidate value extractor to extract the candidate value,
   a relationship generator to generate the relationship,
   an association generator to associate the candidate paragraph noun with the candidate header noun, and
   a standardization generator to generate the key performance indicator.

14. A system for extracting a key performance indicator from textual data, the system comprising:
   one or more processors; and
   at least one memory storing instructions that, when executed by the one or more processors, cause the one or more processors to perform operations including:
      determining a first bounding box in textual data, wherein the first bounding box includes text grouped by position in the textual data;
      categorizing the first bounding box into a paragraph category among a list of categories including a header category, a section header category, the paragraph category, and a noise category;
      extracting a candidate noun from the text in the categorized first bounding box, as a candidate paragraph noun;

extracting a candidate value from the text in the categorized first bounding box;

generating a relationship between the candidate paragraph noun and the extracted candidate value;

associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

15. The system of claim 14, wherein determining the first bounding box includes using a segmentation model that uses image features, positional features, and text features to optimize and merge close and overlapping bounding boxes.

16. The system of claim 14, wherein extracting the candidate noun from the text in the categorized first bounding box includes using part-of-speech tags to extract the candidate noun from a sentence in the textual data.

17. The system of claim 14, wherein extracting the candidate value from the text in the categorized first bounding box includes using a pre-trained Named Entity Recognition model to extract the candidate value from a sentence in the textual data.

18. The system of claim 14, wherein generating the relationship includes using a classification model that is a binary classifier which predicts whether a relationship exists between the candidate noun and the candidate value, based on (i) word embedding of the candidate noun, (ii) word embedding of the candidate value, and (iii) averaged word embeddings of tokens present between the candidate noun and the candidate value.

19. The system of claim 14, wherein extracting the candidate noun from the text in the categorized first bounding box includes extracting noun phrases from a sentence in the textual data.

20. A non-transitory computer readable medium for extracting a key performance indicator from textual data, the non-transitory computer readable medium storing instructions that, when executed by one or more processors, cause the one or more processors to perform operations comprising:

determining a first bounding box in textual data, wherein the first bounding box includes text grouped by position in the textual data;

categorizing the first bounding box into a paragraph category among a list of categories including a header category, a section header category, the paragraph category, and a noise category;

extracting a candidate noun from the text in the categorized first bounding box, as a candidate paragraph noun;

extracting a candidate value from the text in the categorized first bounding box;

generating a relationship between the candidate paragraph noun and the extracted candidate value;

associating the candidate paragraph noun with a candidate header noun, wherein the candidate header noun is an extracted candidate noun from text in a second bounding box categorized into the header category or the section header category; and generating a key performance indicator using the candidate header noun, the candidate paragraph noun, the candidate value, and the generated relationship.

* * * * *